United States Patent
Sridharan et al.

(10) Patent No.: US 7,740,899 B2
(45) Date of Patent: Jun. 22, 2010

(54) ELECTRONIC DEVICE HAVING LEAD AND CADMIUM FREE ELECTRONIC OVERGLAZE APPLIED THERETO

(75) Inventors: Srinivasan Sridharan, Strongsville, OH (US); Michail Moroz, Oceanside, CA (US)

(73) Assignee: Ferro Corporation, Cleveland, OH (US)

( * ) Notice: Subject to any disclaimer, the term of this patent is extended or adjusted under 35 U.S.C. 154(b) by 1484 days.

(21) Appl. No.: 10/431,346

(22) Filed: May 7, 2003

(65) Prior Publication Data
US 2004/0018931 A1 Jan. 29, 2004

Related U.S. Application Data

(63) Continuation-in-part of application No. 10/146,493, filed on May 15, 2002, now abandoned.

(51) Int. Cl.
*B05D 5/12* (2006.01)
*B05D 3/02* (2006.01)
(52) U.S. Cl. ............... 427/96.2; 427/276.2; 427/397.7
(58) Field of Classification Search ............. 427/58, 427/96.2, 96.4, 376.2; 501/14, 18, 23, 26, 501/72, 76, 79
See application file for complete search history.

(56) References Cited

U.S. PATENT DOCUMENTS

| | | | |
|---|---|---|---|
| 4,285,731 A * | 8/1981 | Nigrin | 501/21 |
| 4,446,241 A * | 5/1984 | Francel et al. | 501/14 |
| 4,892,847 A | 1/1990 | Reinherz | |
| 4,970,178 A * | 11/1990 | Klimas et al. | 501/26 |
| 5,200,369 A | 4/1993 | Clifford et al. | |
| 5,244,848 A * | 9/1993 | Clifford et al. | 501/66 |
| 5,306,674 A | 4/1994 | Ruderer et al. | |
| 5,725,919 A | 3/1998 | Roberts et al. | |
| 5,753,571 A * | 5/1998 | Donohue | 501/77 |
| 5,783,507 A | 7/1998 | Sakoske | |
| 5,827,789 A * | 10/1998 | Tunker et al. | 501/17 |
| 5,998,037 A | 12/1999 | Sridharan et al. | |
| 6,171,987 B1 * | 1/2001 | Hormadaly | 501/26 |
| 6,346,493 B1 | 2/2002 | Kniajer et al. | |

FOREIGN PATENT DOCUMENTS

| | | |
|---|---|---|
| EP | 0370683 A1 | 5/1990 |
| GB | 2351080 A | 12/2000 |

* cited by examiner

*Primary Examiner*—Brian K Talbot
(74) *Attorney, Agent, or Firm*—Rankin, Hill & Clark LLP

(57) ABSTRACT

The present invention provides an electronic device having a lead-free and cadmium-free glass composition applied thereto and fired to form an acid resistant overglaze, and a method of overglazing an electronic device using the lead-free and cadmium-free glass composition. The lead-free and cadmium-free glass composition fuses at low firing temperatures and is particularly suitable for use in thick film pastes. The glass composition forms predominantly bismuth titanate and/or zinc titanate crystals upon firing. Preferably, glass compositions include by weight from about 11% to about 52% $SiO_2$, from 3.4% to about 40% $TiO_2$, up to about 75% $Bi_2O_3$, up to about 40% by weight ZnO, where the sum of $Bi_2O_3$ and ZnO comprises from about 15% to about 85% of the glass composition by weight.

16 Claims, No Drawings

ELECTRONIC DEVICE HAVING LEAD AND CADMIUM FREE ELECTRONIC OVERGLAZE APPLIED THERETO

CROSS-REFERENCE TO RELATED APPLICATION

This is a continuation-in-part of application Ser. No. 10/146,493 filed May 15, 2002.

FIELD OF INVENTION

The present invention relates to an electronic device having a lead-free and cadmium-free glass composition applied thereto and fired to form an acid resistant overglaze, and a method of overglazing an electronic device using the lead-free and cadmium-free glass composition.

BACKGROUND OF THE INVENTION

Thick film pastes containing low-melting glass compositions are used to encapsulate electronic devices and circuits and thereby protect them from the environment. Glass compositions suitable for use in such electronic overglaze applications must have a relatively low melting point, must exhibit appropriate thermal expansion, and should not significantly alter the electrical performance of the overprinted electronic materials.

Vasudevan et al., U.S. Pat. No. 5,792,716, disclose a thick film paste that includes a glass composition comprising in weight percent from about 30% to about 60% PbO, from about 5% to about 20% ZnO, from about 2% to about 20% $B_2O_3$, from about 4% to about 12% $Al_2O_3$, from about 5% to about 18% $SiO_2$, up to about 8% $ZrO_2$, up to about 8% $TiO_2$ and from about 9% to about 21% $Nb_2O_5$. Upon firing, the composition according to Vasudevan et al. displays a high level of acid resistance, which is an increasingly important characteristic for electronic overglazes.

Due to concerns regarding the toxicity of lead, there have been substantial efforts in the industry to develop lead-free electronic overglaze compositions. An example of one such lead-free glass composition for use in thick film pastes is disclosed in Hormadaly, U.S. Pat. No. 6,171,987. The glass composition according to Hormadaly includes, in mole percent, 40 to 65% $SiO_2$, 10 to 20% $Bi_2O_3$, 0.1 to 3% $Al_2O_3$, a total of 15 to 25% glass modifiers, wherein the glass modifiers are 1 to 23% ZnO, 0.1 to 5% CuO, 0.1 to 5 CaO, and 0.1 to 2 MgO, and other glass-forming compounds including at most a total of 5% of $TiO_2$ and/or $ZrO_2$. However, demanding applications, such as surge resistor over glazes, require glass compositions that are much more acid resistant and that crystallize rapidly to minimize interaction with underlying electrical components. The present invention provides a new and improved thick film material for use as an over glaze that provides excellent acid resistance together with rapid crystallization characteristics.

SUMMARY OF INVENTION

The present invention provides an electronic device having a lead-free and cadmium-free glass composition applied thereto and fired to form an acid resistant overglaze, and a method of overglazing an electronic device using the lead-free and cadmium-free glass composition. The lead-free and cadmium-free glass composition partially crystallizes and fuses at relatively low firing temperatures. The crystals formed during firing predominantly comprise bismuth titanates and/or zinc titanates. Subsequent to firing, the glass composition forms an overglaze on the electronic device that exhibits excellent resistance to acids and other chemical agents, far surpassing the acid resistance provided by prior art low-melting lead-free and cadmium-free glass compositions.

The glass composition according to the invention preferably comprises by weight from about 11% to about 52% $SiO_2$, from 3.4% to about 40% $TiO_2$, up to about 75% $Bi_2O_3$, up to about 45% by weight ZnO, where the sum of $Bi_2O_3$ and ZnO comprises about 15% to about 85% of the glass composition by weight. Although the $SiO_2$ content of the glass composition is relatively low, non-silicate containing bismuth titanate and/or zinc titanate crystals form and grow during firing, leaving most of the $SiO_2$ concentrated in the residual glass. This is believed to be the reason why the fired glass composition of this invention exhibits such an excellent acid resistance and low reactivity with the underlying electronic components that it protects.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF PREFERRED EMBODIMENTS

The present invention provides an electronic device having a lead-free and cadmium-free glass composition applied thereto and fired to form an acid resistant overglaze. Electronic devices upon which the lead-free and cadmium-free glass composition can be applied and fired include thick film and/or hybrid thick devices such as, for example, surge resistors (such as thick film resistors printed on alumina substrates that are used to protect telephone lines from lightning or other electrical overvoltage conditions), high-current high-power automotive electronics (e.g., air bag deployment sensors, weight-sensors, anti-lock braking systems, and a variety of other automotive sensors), and thick film resistive heating elements. Throughout the instant specification and in the appended claims, the term "electronic device" means any electronic device that includes thick film and/or hybrid thick film circuitry that would survive the firing temperatures and benefit from the protection provided by the lead-free and cadmium-free electronic overglaze composition.

The lead-free and cadmium-free glass composition is preferably applied in the form of a thick-film paste to a surface of an electronic device upon which has been formed one or more circuits or other electronic components (e.g., capacitors and resistors). The thick-film paste is preferably dried and fired, as is more thoroughly described below, to form a lead and cadmium free acid resistant protective overglaze that comprises residual glass and predominantly non-silicate bismuth titanate and/or zinc titanate crystals. As used throughout the instant specification in the appended claims, the phrase "lead-free and cadmium-free" means that no lead, or PbO, cadmium, or CdO, has been intentionally added to the composition, and that the composition comprises less than about 0.5% by weight PbO or CdO upon firing. A predominant portion of the non-silicate crystals formed upon firing are titanates, preferably bismuth titanates and/or zinc titanates. Throughout the instant specification and in the appended claims, the term "predominant portion" means more than 50% by weight of all crystals in the fired glass composition.

The lead and cadmium free glass composition preferably comprises by weight from about 11% to about 52% $SiO_2$, from 3.4% to about 40% $TiO_2$, up to about 75% $Bi_2O_3$, up to about 45% by weight ZnO, where the sum of $Bi_2O_3$ and ZnO comprises about 15% to about 85% of the glass composition by weight. More preferably, the glass composition comprises by weight from about 14% to about 35% $SiO_2$, from about 3.4% to about 35% $TiO_2$, from about 8% to about 74% $Bi_2O_3$, up to about 35% by weight ZnO, where the sum of $Bi_2O_3$ and ZnO comprises about 33% to about 74% of the glass composition by weight.

The glass composition can further comprise a total of up to about 35% by weight, and more preferably from about 0.1% to about 30% by weight, of other optional oxides to adjust the flow of the glass, and the properties of the bismuth titanate and/or zinc titanate crystals and the residual glass upon firing. Preferably, such other optional oxides comprise the following: up to about 25%, and more preferably up to about 13%, alkali metal oxides (e.g. $Li_2O$, $Na_2O$, $K_2O$), up to about 20%, and more preferably up to about 8%, $B_2O_3$; up to about 15%, and more preferably up to about 13%, $Al_2O_3$; a total of up to about 25%, and more preferably a total of up to about 20%, alkaline-earth metal oxides (e.g., BaO, SrO, CaO, and MgO); up to about 25%, and more preferably up to about 10%, $V_2O_5$; up to about 15%, and more preferably up to about 8%, $Sb_2O_3$; a total of up to about 25%, and more preferably a total of up to about 20%, of any one or a combination of $La_2O_3$, $Y_2O_3$, $Nb_2O_5$, and $ZrO_2$; a total of up to about 30%, and more preferably a total of up to about 25%, of any one or a combination of $Fe_2O_3$, $MnO_2$, $Cr_2O_3$, CuO, NiO, $Co_2O_3$, and $CeO_2$; and a total of up to about 20%, and more preferably a total of up to about 15%, of any one or a combination of SnO, $In_2O_3$, and $Mo_2O_3$.

It will be appreciated that the glass composition can comprise one glass frit, or it can comprise a mixture of several glass frits, including non-crystallizing glass frits, so as to obtain a glass composition providing the overall oxide composition as previously described. In the presently most preferred embodiment of the invention, the glass composition comprises one glass frit.

The glass composition of the present invention can be prepared in any conventional manner. For example, a mixture of the appropriate ingredients or precursors can be placed in a high-silica crucible and melted (e.g., 1100° C. to 1500° C.), the resulting glass composition is then poured onto cold steel rolls to form thin flakes suitable for milling. These flakes are then milled to a suitable particle size distribution (e.g., average particle size of about 3 to about 6 microns). It will be appreciated that a coarser particle size of 40-50 microns can be used in dip coating and spraying applications.

In order to produce a thick film paste, the glass composition is dispersed in a suitable conventional binder system to form a suitable paste. The binder system is preferably an organic binder system and it is provided in an amount sufficient to disperse the solids in the binder and to at least temporarily bond the resultant composition to a substrate or surface prior to firing. In practice, the solid components, i.e., the glass composition and any added fillers or expansion modifiers, are preferably present in the range of from about 40% to about 97% by weight of the paste composition, and the binder system is preferably present in an amount ranging from about 3% to about 60% by weight of such paste composition.

In addition to the glass composition and the binder, various conventional fillers or expansion modifiers may be included in the overglaze. Examples of such fillers or expansion modifiers include zinc silicates, magnesium silicates, barium silicates, strontium silicates, barium or strontium aluminum silicates, lithium alumino silicates, zirconium silicates, barium magnesium silicates, barium titanium silicates, cordierite, zirconia, alumina, silica, titania and mixtures of the foregoing.

The organic binder is usually an organic resin mixed with a suitable vehicle. The vehicle generally includes one or more solvents. Any essentially inert binder can be used in the practice of the present invention, including various organic liquids, with or without thickening and/or stabilizing agents and/or other common additives. Exemplary of the organic liquids which can be used are the aliphatic alcohols; esters of such alcohols, for example, the acetates and propionates; terpenes such as pine oil, terpineol and the like; solutions of resins such as the polymethacrylates of lower alcohols, or solutions of ethyl cellulose in solvents such as pine oil, the monobutyl ether of ethylene glycol monoacetate, and carbinol. The binder can contain volatile liquids to promote fast setting after application to the substrate. It will be appreciated that the binder system may also comprise water and a water compatible binder. Any one of a number of commercially available water compatible binders may be utilized.

In one embodiment of the invention, the binder contains from about 0.1% to about 20% by weight resin and about 80% to about 99.9% by weight solvent or mixture of solvents. The resin can be ethyl cellulose or an acrylate resin (e.g., methyl methacrylate). The solvent can be terpineol, 2,4,4-trimethyl-1,3-pentanediol monoisobutylrate, N-methyl-2-pyrrolidone or mixtures thereof. The binder can include a thixotropic material, preferably at a concentration of less than about 0.25% by weight.

The inventive paste compositions are applied to a surface of an electronic device using techniques that are well known to those skilled in the art. An example of such a technique is silk screening wherein the paste is forced through a fine mesh stainless steel screen in a desired pattern. Typically the size of such a screen varies from about 100 to about 400 mesh. Other examples include spraying, dipping, electro coating, spinning, brushing, application using a doctor blade and ink jet printing.

Once the paste is applied to a surface of an electronic device, the paste is then dried and fired at a peak temperature in the range of from about 450° C. to about 850° C., preferably from about 485° C. to about 800° C., and more preferably from about 550° C. to about 700° C. Preferably, firing at the peak temperature is maintained for about 5 to about 20 minutes, more preferably about 9 to about 15 minutes. The heating rate is preferably about 3 to 50° C./min, more preferably about 20 to 30° C./min. The cooling rate can be preferably 3 to 100° C./min.

The term "firing" is used herein to mean heating to a temperature and for a time sufficient to volatilize (burnout) all of the organic material in the paste and to sinter the glass composition. Depending on the particular application, the paste may be applied and co fired with the underlying material that is being over glazed, or it may be applied and fired after the underlying material has been fired (i.e., used on a post fired basis).

Upon firing, a glass composition according to the invention will form crystals that predominantly comprise bismuth titanates and/or zinc titanates and/or bismuth vanadium titanates. The term "and/or" as used in this context means that the predominant crystals formed upon firing will comprise: (a) a combination of bismuth titanate crystals and zinc titanate crystals; (b) bismuth titanate crystals, but not zinc titanate crystals; or (c) zinc titanate crystals, but not bismuth titanate crystals; or (d) bismuth vanadium titanate crystals, but not bismuth titanate or zinc titanate crystals; or (e) a combination of bismuth vanadium titanate crystals, bismuth titanate crystals and zinc titanate crystals; or (f) a combination of bismuth vanadium titanate crystals and either bismuth titanate crystals or zinc titanate crystals. It will be appreciated that in addition to the predominant bismuth titanate and/or zinc titanate or bismuth vanadium titanate crystals, lesser amounts of other crystal forms (e.g., transition metal titanates, bismuth silicate, zinc silicate, bismuth borate, zinc borate) may also be formed upon firing if the conditions are suitable.

Depending upon the composition of the glass, various different types of titanate crystals can be formed upon firing. For example, when the glass composition comprises appropriate amounts of $Bi_2O_3$, $TiO_2$, and $V_2O_5$, orthorhombic bismuth-vanadium titanate crystals ($6.5Bi_2O_3.2.5V_2O_5.TiO_2$) may be formed upon firing. In the absence of $V_2O_5$, cubic bismuth titanate crystals ($Bi_2O_3.2TiO_2$), orthorhombic bismuth titanate crystals ($2Bi_2O_3.3TiO_2$), or a combination of both cubic and orthorhombic bismuth titanate crystals may be formed. Moreover, when the glass component contains appropriate amounts of ZnO, hexagonal zinc titanate ($ZnO.TiO_2$) and/or cubic zinc titanate crystals ($2ZnO.3TiO_2$) may be formed in addition to bismuth titanate crystals. It will be appreciated that the solids portion of the overglaze system according to the invention can further comprise seed materials (e.g., bismuth titanates etc.) to promote the rapid formation of titanate crystals upon firing.

The overglaze layer formed according to the present invention far surpasses the acid resistance of overglaze layers formed using known partially crystallizing lead-free and cadmium-free glass compositions. Preferred glass compositions, when applied and fired on a surface of an electronic device in accordance with the present invention, exhibit a weight loss of less than 20%, and more preferably less than 5%, when immersed in 86° C. 0.1 N $H_2SO_4$ solution for 20 hours.

Without being bound to a particularly theory, applicants speculate that as the predominant titanate crystals form and grow during firing, $TiO_2$ and $Bi_2O_3$ and/or ZnO are depleted from the residual glass, but $SiO_2$ is not. As the titanate crystals grow, the concentration of $SiO_2$ remaining in the residual glass surrounding the crystals increases. Generally speaking, a residual glass that is rich in $SiO_2$ is substantially more resistant to chemical attack than a residual glass that has been depleted of $SiO_2$ due to the formation of silicate crystals, such as is the case with known partially crystallizing lead-free and cadmium-free glass systems. Since both titanate crystals and $SiO_2$ rich residual glass are very acid resistant, the resulting overglaze exhibits excellent chemical durability.

The following examples are intended only to illustrate the invention and should not be construed as imposing limitations upon the claims.

EXAMPLE 1

Glasses A through F were prepared using conventional glass making techniques such that they had compositions in weight percent shown in Table 1 below. Glasses A through F precipitate predominantly titanate crystals, and thus when viewed alone, do provide a glass component within the scope of the present invention.

TABLE 1

| Glass | Constituents (Weight Percent) | | | | | | | |
|---|---|---|---|---|---|---|---|---|
| | $Bi_2O_3$ | ZnO | $SiO_2$ | $TiO_2$ | $B_2O_3$ | $K_2O$ | $Li_2O$ | Others |
| A | 50.8 | — | 33.8 | 3.6 | 5.0 | 5.2 | 1.6 | — |
| B | 48.4 | — | 28.2 | 12.1 | 4.8 | 4.9 | 1.6 | — |

TABLE 1-continued

| Glass | Constituents (Weight Percent) | | | | | | | |
|---|---|---|---|---|---|---|---|---|
| | $Bi_2O_3$ | ZnO | $SiO_2$ | $TiO_2$ | $B_2O_3$ | $K_2O$ | $Li_2O$ | Others |
| C | 48.4 | — | 32.2 | 3.4 | 4.8 | 4.9 | 1.6 | 4.7 ($V_2O_5$) |
| D | 48.4 | — | 20.2 | 20.1 | 4.8 | 4.9 | 1.6 | — |
| E | 62.8 | 5.1 | 15.9 | 8.4 | 3.3 | 3.4 | 1.1 | — |
| F | 23.1 | 18.2 | 28.3 | 19.8 | 5.2 | 4.2 | 1.2 | — |

EXAMPLE 2

To test the chemical durability of these glasses, glasses A through F from Example 1 were each then milled to an average particles size of about 5 microns and then dispersed in C31 medium (available from Ferro corporation of Cleveland, Ohio) and mixed in a high shear mixer for about 10 minutes. The weight ratio of the solids to medium was about 7.5. The resulting pastes were each screen printed onto 5 cm by 10 cm by 3 mm thick automotive windshield glass coupons (on the tin side) using a 160 mesh screen to a wet print thickness of about 1 to about 1.5 mils. The glass coatings were dried in a forced air oven at about 85° C. for about 30 minutes and then heat treated in an oven held at about 677° C. for about 5 minutes. After cooling to room temperature (about 25° C.), X-ray diffraction patterns of the fired glass coating were taken using Cu K-alpha radiation to determine the type of crystalline materials, if any, precipitated in the glass coating during the 677° C. heat treatment. The results are reported in Table 2 below, where "BT2" means cubic bismuth titanate ($Bi_2O_3.2TiO_2$) crystals; "B2T3" means orthorhombic bismuth titanate ($2Bi_2O_3.3TiO_2$) crystals; "Z2T3" means cubic zinc titanate ($2ZnO.3TiO_2$) crystals; "BS" means bismuth silicate ($Bi_2O_3.SiO_2$) crystals; and "B6.5V2.5T" means orthorhombic bismuth vanadium titanate ($6.5Bi_2O_3.2.5V_2O_5.TiO_2$) crystals. The fused glass coatings were also tested for chemical resistance in various solutions as reported in Table 2 as weight loss in mg per 27 $cm^2$ for the given length of time (1 to 20 hr) as noted.

TABLE 2

| Glass | Crystal Type(s) | Percent Weight Loss In | | | |
|---|---|---|---|---|---|
| | | $H_2SO_4$ 0.1 N 25° C. 2 Hrs. | $HNO_3$ 10% (wt) 25° C. 1 Hr. | HCl 10% (wt) 25° C. 1 Hr. | $H_2SO_4$ 0.1 N 86° C. 20 Hrs. |
| A | BT2 + BS | 0.9 | 0.1 | 2.4 | 3.2 |
| B | BT2 + B2T3 | 0.3 | 0.6 | 0.2 | 0.7 |
| C | B6.5V2.5T | 0.9 | 2.6 | 4.9 | 0.2 |
| D | BT2 + B2T3 | 0.1 | 0.4 | 0.3 | 0.5 |
| E | B2T3 + BT2 | 0.5 | 13.2 | 5 | 2.3 |
| F | Z2T3 | 0.4 | 0.2 | 0.1 | 3.5 |

EXAMPLE 3

Representative glasses from U.S. Pat. No. 6,171,987, as reported in Table 3, were prepared as in Example 1. In these JH5, JH6, JH9, JH35 respectively are the examples 5, 6, 9, and 35 from U.S. Pat. No. 6,171,987. Further, JH5A, JH6A, JH9A, JH35A are derived respectively from JH5, JH6, JH9 and JH35 wherein $TiO_2$ was increased to 5 mole %, the limit of $TiO_2$ and $ZrO_2$, as taught by U.S. Pat. No. 6,171,987. The chemical durability of these glasses was evaluated as in Example 2 using glass B of this invention (cf Table 1) as reference. The percent weight loss in hot (86° C.) 0.1 N $H_2SO_4$ after 20 hrs of exposure, tabulated in Table 4, shows that the glasses of this invention are more durable than the prior art lead free over glaze glasses.

TABLE 3

| | Constituent (Weight Percent) | | | | | | | | | | | | |
|---|---|---|---|---|---|---|---|---|---|---|---|---|---|
| Glass | $Bi_2O_3$ | $ZnO_3$ | $SiO_2$ | $TiO_2$ | $B_2O_3$ | $Na_2O$ | $Li_2O$ | CaO | MgO | BaO | CuO | $Al_2O_3$ | $ZrO_2$ |
| JH5 | 54.09 | 3.78 | 23.71 | 1.24 | 5.39 | — | — | 1.74 | 0.31 | 4.75 | 2.46 | 1.58 | 0.95 |
| JH6 | 54.50 | 3.81 | 28.57 | 1.25 | — | — | — | 1.75 | 0.31 | 4.78 | 2.48 | 1.59 | 0.96 |
| JH9 | 55.84 | 6.50 | 23.52 | 1.28 | 5.56 | 0.99 | 0.95 | 1.79 | 0.32 | — | 0.64 | 1.63 | 0.98 |
| JH35 | 64.57 | 5.64 | 26.22 | — | — | — | — | 0.78 | 0.28 | — | 1.10 | 1.41 | — |
| JH5A | 53.57 | 3.74 | 23.49 | 3.13 | 5.34 | — | — | 1.72 | 0.31 | 4.70 | 2.44 | 1.56 | — |
| JH6A | 53.96 | 3.77 | 28.30 | 3.15 | — | — | — | 1.73 | 0.31 | 4.74 | 2.46 | 1.58 | — |
| JH9A | 55.26 | 6.43 | 23.28 | 3.26 | 5.50 | 0.98 | 0.95 | 1.77 | 0.32 | — | 0.63 | 1.61 | — |
| JH35A | 62.74 | 5.48 | 25.48 | 2.83 | — | — | — | 0.76 | 0.27 | — | 1.07 | 1.37 | — |

TABLE 4

| Glass | Crystal Type(s) | Percent Weight Loss 0.1 N. H2SO4 at 86° C. After 20 Hrs. |
|---|---|---|
| B | BT2 + B2T3 | 0.7 |
| JH5 | Glass | 19.1 |
| JH6 | Glass | 6.4 |
| JH9 | Glass | 43.4 |
| JH35 | Glass | 5.3 |
| JH5A | Glass | 17.6 |
| JH6A | Glass | 8.8 |
| JH9A | Glass + some B2T3 | 17.1 |
| JH35A | Glass | 13.6 |

EXAMPLE 4

Overglaze Ink Composition 1 was prepared by mixing 75.5 parts by weight of Glass A from Example 1 above with 1.5 parts by weight $Cr_2O_3$ pigment, 19.3 parts by weight V384, 2.0 parts by weight V435, and 1.7 parts by weight V450 (V384, V435, and V450 are binder systems available from Ferro Corporation of Cleveland, Ohio). Overglaze Ink Composition 2 was prepared in the same manner as Overglaze Ink Composition 1, except Glass B from Example 1 was substituted for Glass A. Overglaze Composition 3 was prepared in the same manner as Overglaze Ink Composition 1, except Glass C from Example 1 was substituted for Glass A. And, Overglaze Ink Composition 4 is the standard lead containing overglaze, FX11-125, sold by Ferro corporation of Cleveland, Ohio.

EXAMPLE 5

A standard surge resistor circuit consisting of FX34-063 Ag/Pd conductor and RE88-0.5-2 resistor was applied to 96% alumina substrates and then fired at 850° C. FX34-063 and RE88-0.5-2 are standard materials sold by Ferro Corporation of Cleveland, Ohio. Then Overglaze Ink Compositions 1 through 4 from Example 4 were each separately applied by screen printing, to a dried thickness of 20±2 microns, on the alumina substrates containing the pre fired surge resistor circuits and then fired at 600° C. for 10 minutes.

The overglazed substrates were then evaluated for the following characteristics: (a) percent resistance shift after thermal treatment at 600° C.; (b) temperature coefficient of resistance (TCR) in ppm both hot (125° C.) and cold (−55° C.), while the reference temperature was 25° C.; (c) percent resistance shift after non-destructive surge testing (at constant voltage 2,800 V); and (d) voltage to failure of surge resistors (starting at 2,800 V up to resistor failure), both open (measured at voltage generator output) and loaded (measured on the tested resistor). Surge tests were performed with CDI-1000i Universal Surge Generator using 10×700 μsec 5 kV/125A Waveshape Plug-in. Temperature coefficient of resistance (TCR) is the unit change in resistance per degree of temperature change and is calculated from 'Ro' the measured resistance in ohms at measured lower temperature 'To' ° C. (about 25° C.) in the test range (° C.), and from 'R' the measured resistance in ohms at the higher temperature 'T' ° C. in the test range (° C.), (125° C. for hot TCR and −55° C. for cold TCR) as:

$$TCR(ppm/° C.) = \frac{(R - R_0) \times 10^6}{R_0(T - T_0)}$$

The test results are reported in Table 5 below:

TABLE 5

| Overglaze Ink Composition | % Resistance Shift After Overglazing | TCR, ppm Hot/Cold | % Resistance Shift After Non-Destructive Surge Test | Voltage to Failure Open/Loaded |
|---|---|---|---|---|
| 1 | +1.4 | +349/+296 | +0.01 | 3865/1395 |
| 2 | +2.1 | +345/+313 | −0.07 | 3865/1380 |
| 3 | +2.2 | +345/+302 | +0.01 | 3600/1270 |
| 4 | +2.0 | +333/+358 | −0.06 | 3865/1400 |

EXAMPLE 6

Overglaze Ink Composition 6 was prepared by mixing 68.7 parts by weight of Glass A from Example 1 above with 4.9 parts by weight of EG0225SRRG Cordierite (available from Ferro Corporation of Cleveland, Ohio), 1.5 parts by weight $Cr_2O_3$ pigment, 21.0 parts by weight V384, 2.2 parts by weight V435, and 1.7 parts by weight V450. Over glaze Ink Composition 7 was prepared in the same manner as Over glaze Ink Composition 6, except Glass B from Example 1 was substituted for Glass A. Over glaze Composition 8 is the standard lead containing over glaze, FX11-125, sold by Ferro Corporation of Cleveland, Ohio.

EXAMPLE 7

Over glaze Ink Compositions 6 through 8 from Example 6 were each separately applied by screen printing on surge resistor circuits and tested as explained in Example 5. The test results are reported in Table 6 below:

TABLE 6

| Overglaze Ink Composition | % Resistance Shift After Overglazing | % Resistance Shift After Non-Destructive Surge test | Voltage to Failure Open/Loaded |
|---|---|---|---|
| 6 | +0.70 | −0.01 | 3940/1290 |
| 7 | +1.14 | +0.07 | 3880/1260 |
| 8 | +0.45 | +0.10 | 3870/1270 |

EXAMPLE 8

Over glaze Ink Compositions 6 through 8 from Example 6 were each separately applied to 2"×2" alumina substrates to a printed thickness of about 20 microns and then fired at about 600° C. for 10 minutes. Each of these fired substrates was carefully weighed using a high precision scale (to four digits beyond the decimal point). The substrates were then immersed in KESTER® 1544 Rosin Solder Flux (a mixture comprising 25% ethanol, 25% 2-butanol, and 50% rosin, by weight) in separate containers for 18 hours. KESTER® is the registered trademark of Kester Solder, Des Plaines, Ill. 60018-2675. The substrates were then removed from the containers and washed with isopropyl alcohol and then air dried. The substrates were then weighed to determine percent weight loss. The percent weight loss for substrates printed with Overglaze Ink Compositions 6 through 8 was 0.0026%, 0.0183%, and 0.0076%, respectively. Therefore, the performances of the overglazes made with lead free electronic glasses are comparable to conventional overglazes made with lead-based electronic glasses.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed:

1. A method of forming a protective overglaze on a surface of an electronic device comprising:
    applying a lead-free and cadmium-free glass composition to the surface of the electronic device; and
    firing the glass composition to form the protective overglaze on the surface, wherein the glass composition comprises by weight from about 11% to about 52% $SiO_2$, from 3.4% to about 40% $TiO_2$, up to about 75% $Bi_2O_3$, up to about 45% by weight ZnO, provided the sum of $Bi_2O_3$ and ZnO comprises from about 15% to about 85% of the glass composition.

2. The method according to claim 1 wherein the glass composition comprises by weight from about 14% to about 35% $SiO_2$, from 3.4% to about 35% $TiO_2$, from about 8% to about 74% $Bi_2O_3$, up to about 35% by weight ZnO, where the sum of $Bi_2O_3$ and ZnO comprises from about 33% to about 74% of the glass composition by weight.

3. The method according to claim 1 wherein said glass composition further comprises one or more optional oxides selected from the group consisting of alkali metal oxides, $B_2O_3$, $Al_2O_3$, alkaline-earth metal oxides $V_2O_5$, $Sb_2O_3$, $La_2O_3$, $Y_2O_3$, $Nb_2O_5$, $ZrO_2$, $Cr_2O_3$, $Fe_2O_3$, $MnO_2$, CuO, NiO, $Co_2O_3$, $CeO_2$, SnO, $In_2O_3$, and $Mo_2O_3$, provided that the total amount of said optional oxides present in said glass composition is limited to up to about 35% by weight, and further provided that the amount of alkali metal oxides is limited to up to 25% of the glass composition by weight, the amount of $Bi_2O_3$ is limited to up to about 20% of the glass composition by weight, the amount of $Al_2O_3$ is limited to up to about 15% of the glass composition by weight, the amount of alkaline-earth metal oxides is limited to a total of up to about 25% of the glass composition by weight, the amount of $V_2O_5$ is limited to up to about 25% of the glass composition by weight, the amount of $Sb_2O_3$ is limited to up to about 15% of the glass composition by weight, the amount of any one or a combination of the $La_2O_3$, $Y_2O_3$, $Nb_2O_5$, and $ZrO_2$ is limited to a total of up to about 25% of the glass composition by weight, the amount of any one or a combination of the $Cr_2O_3$, $Fe_2O_3$, $MnO_2$, CuO, NiO, $Co_2O_3$, and $CeO_2$ is limited to a total of up to about 30% of the glass composition by weight, and the amount of any one or a combination of SnO, $In_2O_3$, and $Mo_2O_3$ is limited to a total of up to about 20% of the glass composition by weight.

4. The method according to claim 2 wherein said glass composition further comprises a total of from about 0.1% to about 30% by weight of optional oxides, said optional oxides comprising by weight up to 13% alkali metal oxides, up to about 8% $B_2O_3$, up to about 13% $Al_2O_3$, a total of up to about 20% alkaline-earth metal oxides, up to about 10% $V_2O_5$, up to about 8% $Sb_2O_3$, a total of up to about 20% of any one or a combination of $La_2O_3$, $Y_2O_3$, $Nb_2O_5$, and $ZrO_2$, a total of up to about 25% of any one or a combination of $Cr_2O_3$, $Fe_2O_3$, $MnO_2$, CuO, NiO, $Co_2O_3$, $CeO_2$, and a total of up to about 15% of any one or a combination of SnO, $In_2O_3$, and $Mo_2O_3$.

5. The method according to claim 1 wherein said glass composition is dispersed in a binder system to form a paste, and said paste further comprises one or more selected from the group consisting of inorganic pigments, fillers, and seeds for titanate crystals.

6. The method according to claim 1 wherein said glass composition comprises a combination of two or more glass frits.

7. A method of forming a protective overglaze on a surface of an electronic device comprising:
    applying a lead-free and cadmium-free glass composition to the surface of the electronic device, wherein said glass composition comprises by weight from 3.4% to about 40% $TiO_2$; and
    firing the glass composition at a temperature of from about 485° C. to about 850° C. to form the protective overglaze on the surface,
    wherein the fired protective overglaze comprises a combination of residual glass and crystals, and wherein a predominant portion of said crystals comprise non-silicate crystals.

8. The method according to claim 7 wherein the residual glass comprises $SiO_2$.

9. The method according to claim 7 wherein said non-silicate crystals comprise titanate crystals.

10. The method according to claim 9 wherein said titanate crystals comprise bismuth titanates and/or zinc titanates and/or bismuth vanadium titanates.

11. The method according to claim 7 wherein said glass composition further comprises from about 11% to about 52% SiO2, up to about 75% $Bi_2O_3$, up to about 45% by weight ZnO, where the sum of $Bi_2O_3$ and ZnO comprises about 15% to about 85% of the glass composition by weight.

12. The method according to claim 11 wherein said glass composition comprises by weight from about 14% to about 35% $SiO_2$, from 3.4% to about 35% $TiO_2$, from about 8% to about 74% $Bi_2O_3$, up to about 35% by weight ZnO, where the sum of $Bi_2O_3$ and ZnO comprises about 33% to about 74% of the glass composition by weight.

13. The method composition according to claim 7 wherein said glass composition further comprises one or more optional oxides selected from the group consisting of alkali metal oxides, $B_2O_3$, $Al_2O_3$, alkaline-earth metal oxides, $V_2O_5$, $Sb_2O_3$, $La_2O_3$, $Y_2O_3$, $Nb_2O_5$, $ZrO_2$, $Cr_2O_3$, $Fe_2O_3$, $MnO_2$, CuO, NiO, $Co_2O_3$, $CeO_2$, SnO, $In_2O_3$, and $Mo_2O_3$, provided that the total amount of said optional oxides present in said glass composition is limited to up to about 35% by weight, and further provided that the amount of alkali metal oxides is limited to up to 25% of the glass composition by weight, the amount of $B_2O_3$, is limited to up to about 20% of the glass composition by weight, the amount of $Al_2O_3$, is limited to up to about 15% of the glass composition by weight, the amount of alkaline-earth metal oxides is limited to a total of up to about 25% of the glass composition by weight, the amount of $V_2O_5$ is limited to up to about 25% of the glass composition by weight, the amount of $Sb_2O_3$ is limited to up to about 15% of the glass composition by weight, the amount of any one or a combination of the $La_2O_3$, $Y_2O_3$, $Nb_2O_5$, and $ZrO_2$ is limited to a total of up to about 25% of the glass composition by weight, the amount of any one or a combination of the $Cr_2O_3$, $Fe_2O_3$, $MnO_2$, CuO, NiO, $Co_2O_3$, and $CeO_2$ is limited to a total of up to about 30% of the glass composition by weight, and the amount of any one or a combination of SnO, $In_2O_3$, and $Mo_2O_3$ is limited to a total of up to about 20% of the glass composition by weight.

14. The method according to claim 12 wherein said glass composition further comprises a total of from about 0.1% to about 30% by weight of optional oxides, said optional oxides comprising by weight up to 13% alkali metal oxides, up to about 8% $B_2O_3$, up to about 13% $Al_2O_3$, a total of up to about 20% alkaline-earth metal oxides, up to about 10% $V_2O_5$, up to about 8% $Sb_2O_3$, a total of up to about 20% of any one or a combination of $La_2O_3$, $Y_2O_3$, $Nb_2O_5$, and $ZrO_2$, a total of up to about 25% of any one or a combination of $Cr_2O_3$, $Fe_2O_3$, $MnO_2$, CuO, NiO, $Co_2O_3$, and $CeO_2$, and a total of up to about 15% of any one or a combination of SnO, $In_2O_3$, and $Mo_{23}$.

15. The method according to claim 7 wherein said glass composition comprises a combination of two or more glass frits.

16. The method according to claim 7 wherein the lead-free and cadmium-free glass composition is applied to the surface of the electronic device in the form of a thick film paste.

* * * * *